United States Patent
Adams et al.

(10) Patent No.: US 8,023,243 B2
(45) Date of Patent: Sep. 20, 2011

(54) QUICK-OPERATING VALVE

(75) Inventors: Hans Adams, Leverkusen (DE); Bernd Kammerer, Gladbach (DE)

(73) Assignee: Erben Kammerer KG, Bergisch Gladbach (DE)

( * ) Notice: Subject to any disclaimer, the term of this patent is extended or adjusted under 35 U.S.C. 154(b) by 608 days.

(21) Appl. No.: 10/598,963

(22) PCT Filed: Mar. 12, 2005

(86) PCT No.: PCT/EP2005/002661
§ 371 (c)(1),
(2), (4) Date: Sep. 15, 2006

(87) PCT Pub. No.: WO2005/093764
PCT Pub. Date: Oct. 6, 2005

(65) Prior Publication Data
US 2007/0097590 A1  May 3, 2007

(30) Foreign Application Priority Data

Mar. 17, 2004 (DE) .................. 20 2004 004 156 U

(51) Int. Cl.
*H01H 47/00* (2006.01)
(52) U.S. Cl. ........................................... 361/152
(58) Field of Classification Search .......... 361/152, 361/154
See application file for complete search history.

(56) References Cited

U.S. PATENT DOCUMENTS

| | | | |
|---|---|---|---|
| 3,397,322 A * | 8/1968 | Wolgast | 307/141 |
| 4,051,545 A | 9/1977 | Kloss et al. | |
| 4,291,358 A * | 9/1981 | Dettmann et al. | 361/154 |
| 4,649,458 A * | 3/1987 | Arai et al. | 361/152 |
| 4,661,883 A * | 4/1987 | Nishizako et al. | 361/159 |
| 4,705,322 A * | 11/1987 | Yiannoulos | 361/91.6 |
| 4,998,177 A * | 3/1991 | Takizawa et al. | 361/154 |
| 5,164,872 A * | 11/1992 | Howell | 361/3 |
| 5,345,119 A | 9/1994 | Khoury et al. | |
| 6,687,553 B2 * | 2/2004 | Erickson et al. | 700/37 |

FOREIGN PATENT DOCUMENTS

DE       19725317       12/1998

* cited by examiner

*Primary Examiner* — Jared Fureman
*Assistant Examiner* — Tien Mai
(74) *Attorney, Agent, or Firm* — Renner, Otto, Boisselle & Sklar, LLP

(57) ABSTRACT

The switching valve of a quick-operating slider system is an electrically operated stop valve. In the case of a required rapid shutoff, the coil (19) must be de-energized in a very short period of time in order to allow the switching valve (18) to open. For this purpose, a voltage-dependent resistor (33) is provided between the voltage source (25) and the coil (19), said resistor (33) having a high resistance below a switching voltage ($U_s$), but a negligibly small resistance above the switching voltage. An auxiliary voltage source (35) is connected in parallel to the coil (19), the voltage of said auxiliary voltage source (35) being opposite to that of the voltage source (25). In this manner, the switching valve is rapidly opened both when a corresponding signal is received and in the case of power failure.

8 Claims, 2 Drawing Sheets

QUICK-OPERATING VALVE

Figure 1:
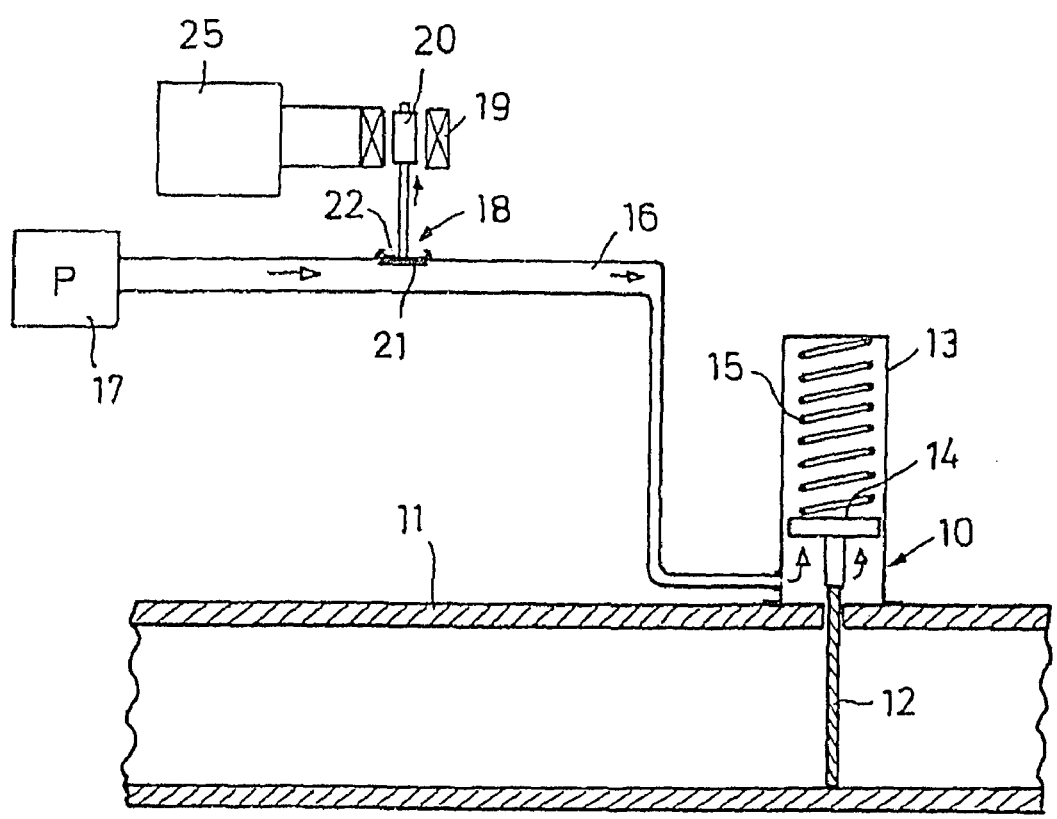

This application is a national phase of International Application No. PCT/EP2005/002661 filed Mar. 12, 2005 and published in the German language.

The invention relates to a quick-acting valve comprising a coil supplied by a voltage source.

Sliders configured for shutting off fluid-carrying conduits are normally actuated fluidically, i.e. hydraulically or pneumatically, by a quick-acting switching valve. The fluids may be gases, liquids, solids or multi-phase fluids. The switching valve is accommodated in a fluid line leading to an actuator of the slider, and it is electrically actuated.

Slider systems frequently require a quick-acting trip function. In the case of power failure or any other disturbance, the slider must be abruptly moved into the closing position. For a fluidically actuated slider, this means that the fluidic pressure must be immediately reduced or applied.

For safety-related applications, e.g. those where explosion-protection or quick-acting sliders are used, an electrically driven relief valve is kept closed with the aid of current by an electromagnet. In the case of power failure, the switching valve is positively opened by springs and/or the medium pressure applied. This ensures that in the case of power failure, the switching valve opens, which, in turn, results in the slider being moved into the closing state. However, the switching valve can open only when the magnetic field of the electromagnet, which maintained the switching valve in the closed state, is reduced to such an extent that the magnetic holding force is decreased below a limit value. The time during which the magnetic flux density of the electromagnet, or the coil current dictating the magnetic field strength, is reduced to a sufficient extent, essentially determines the opening time of the switching valve. The regulations require a slider closing time of 30 milliseconds in certain cases. Due to the inductance of the coil of the switching valve, the closing time is 1.3 seconds as measured in the practice.

It is an object of the invention to provide a quick-acting valve which offers an essentially reduced tripping time.

The quick-acting valve according to the invention is defined in claim 1. According to the invention, a voltage-dependent resistor is provided between the voltage source and the coil of the switching valve, and an auxiliary voltage source is connected in parallel to the coil, the voltage of the auxiliary voltage source being opposite to that of the voltage source.

In the quick-acting valve according to the invention, the exciting current flowing through the coil is not cut off, but the voltage of the voltage source is reduced in conjunction with a corresponding increase in the voltage-dependent resistance. The voltage-dependent resistor comprises a high resistance below a switching voltage $U_s$, and a negligibly small resistance above $U_s$. An auxiliary voltage source is connected in parallel to the coil, which auxiliary voltage source is preferably current-controlled and whose voltage counteracts the coil current during the cutoff process. In the operating state, the applied input voltage is so high that the voltage-dependent resistor is a low-impedance resistor. During the cutoff process, the input voltage falls below the switching voltage $U_s$. The voltage-dependent resistor thus becomes a high-impedance resistor. The major part of the current now flows via the auxiliary voltage source such that the coil can quickly discharge via the low-impedance auxiliary voltage source. Thus, the voltages and the times for cutting off the current are predictable and calculable. This results in defined and short opening times of the safety valve.

In a preferred embodiment of the invention, the auxiliary voltage source is composed of at least one Zener diode. The Zener diode allows a quick and controlled discharge of the coil current which is short-circuited via the Zener diode and is not required to flow via the voltage-dependent resistor. Preferably, the Zener diode is connected in series with a rectifier diode which is impermeable to the current flowing from the voltage source via the Zener diode, and thus blocks said current flow. The rectifier diode is permeable only to the discharge current of the coil.

According to a preferred embodiment of the invention, the voltage-dependent resistor includes a plurality of electronic switches connected in series in the form of a cascade, the electronic switches bridging a respective series resistor and being driven into the closing state when the voltage applied falls below a predetermined switching voltage $U_s$. The division into a plurality of serial electronic switches offers the advantage that in the case of failure of at least one electronic switch, the voltage-dependent resistance becomes high, which results in cutting off of the switching valve. The electronic switches are coupled to control switches in such a manner that they are driven into the closing state when the input voltage falls below the switching voltage $U_s$. The value of the switching voltage $U_s$ is determined by a reference voltage path which includes a plurality of constant-voltage elements, e.g. Zener diodes.

Figure 2:
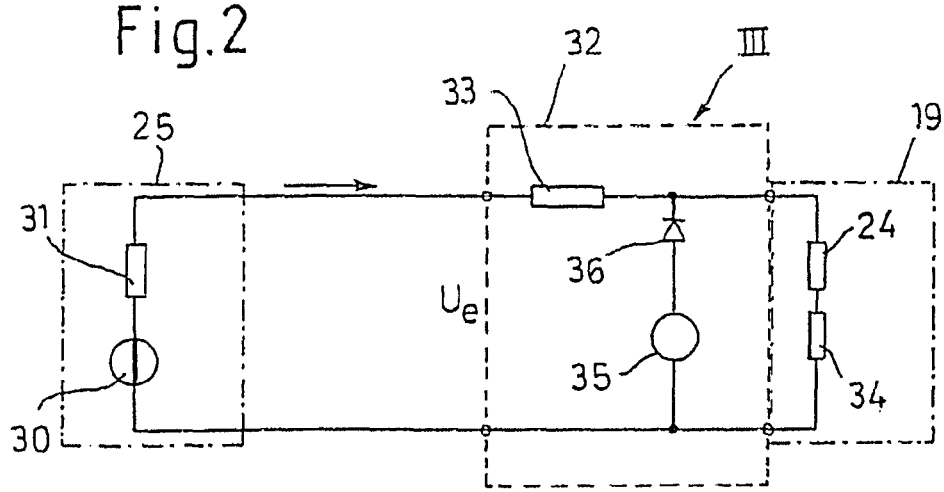
Figure 3:
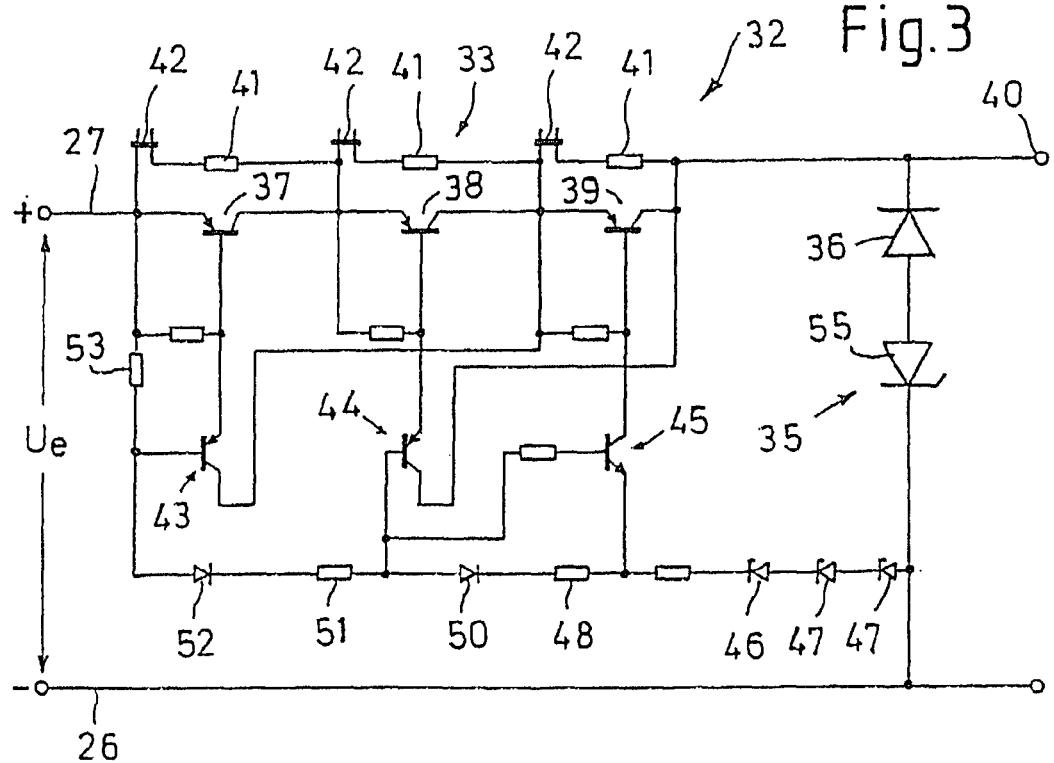

Hereunder an embodiment of the invention is described in detail with reference to the drawings. This detailed description of an embodiment may not be construed as limiting the scope of protection of the invention which is rather defined by the appended claims. In the drawings:

FIG. 1 shows a schematic representation of an overall slider system, including the slider and the quick-acting valve, FIG. 2 shows a schematic diagram of the control circuit of the valve, and FIG. 3 shows a detailed representation of section III of the circuit shown in FIG. 2.

FIG. 1 shows a slider 10 arranged in a conduit 11 and comprising a movable slider plate 12 adapted to block the conduit cross section. The slider 10 comprises an actuator 13 which is pneumatically operated in the illustrated embodiment. The actuator 13 comprises a cylinder having a piston 14. The slider 10 is connected with the piston 14. A spring 15 acts upon the piston 14 and drives the slider into the open position.

The actuator 13 is connected with a pressure line 16 which is connected to a pressure source 17. In the pressure line 16 the quick-acting valve 18 is arranged which, when open, relieves the pressure line 16 and discharges the pressure from the pressure line 16. The valve 18 is a switching valve. It includes an electromagnet comprising a coil 19 in which a ferromagnetic element 20 is arranged. The element 20 is connected with a valve plate 21 which closes an opening 22 in the pressure line 16 when the coil 19 is excited, and lifts the element 20. When the coil 19 is de-energized, the valve plate 21 is lowered due to gravity or with the aid of a spring and clears the opening 22. The coil 19 is connected to a controllable voltage source 25. The voltage source 25 supplies a current which flows through the coil 19 and maintains the switching valve 18 in the closed state. In this state, the slider 10 is maintained in the open state. In the case of power failure or failure of the compressed air, the spring 15 of the actuator 13 drives the slider 10 into the closed position.

FIG. 2 shows the connection of the coil 19 to the voltage source 25. The voltage source comprises the voltage generator 30 and the internal resistor 31. Its voltage can be varied from a high value to a low value for the purpose of cutting off the current.

The voltage source 25 supplies the input voltage $U_e$ for a circuit 32 which comprises a voltage-dependent resistor 33 configured as a series resistor forming, together with the coil 19, a series connection connected to the voltage source 25. The coil 19 comprises an inductor 34 and the series resistor 24. A series connection comprised of an auxiliary voltage source 35 and a rectifier diode 36 is connected in parallel to the coil 19. The rectifier diode 36 has a polarity opposite to the direction of the current supplied by the voltage source 25, i.e. it prevents this current from flowing via the auxiliary voltage source 35.

FIG. 3 shows the circuit 32 comprising the voltage-dependent resistor 33. The circuit 32 comprises a negative lead 26 extending from the voltage source 25 to the coil 19. To the input of the negative lead 26 the input voltage $U_e$ supplied by the voltage source is applied. The positive pole 27 is connected with the output pole 40 via a plurality of transistors 37,38,39 connected in series in the form of a cascade. Each transistor is bridged by a resistor 41 which is series-connected with a contact bridge 42. Each transistor 37,38,39 is controlled by an auxiliary transistor 43,44,45. The emitter of the auxiliary transisfor 45 is connected to a reference path 46 composed of a plurality of Zener diodes 47, which reference path 46 is connected with the line 26. The reference path 46 defines the switching voltage $U_s$ at which the transistors 37,38,39 are driven into the closing state.

One end of the reference path 46 is connected with the line 26, and the other end is connected with a first combination of a series resistor 48 and a diode 50, and a second combination of a series resistor 51 and a diode 52, respectively.

The input voltage $U_e$ applied to the positive pole 27 is fed via a resistor 53 and the resistors 51 and 48 as well as the diodes 52 and 50 to the reference path 46 which generates the reference voltage, and the voltage $U_e$ must fall below the reference voltage for driving the auxiliary transistors 43, 44 and 45 into the closing state, whereby the transistors 37, 38 and 39 are also driven into the closing state.

In normal operation, in which the slider 10 is kept open, the switching valve 18 must be kept closed. This means that the coil 19 is excited. Said excitation is realized in that the voltage source 25 generates the full input voltage $U_e$. When this input voltage $U_e$ is applied to the circuit 32, the transistors 37,38, 39 are in the conductive state, such that the resistors 41 are bridged by the transistors. Current flows through the coil 19 to keep it activated.

If a rapid shutoff of the slider 10 is required, the voltage of the voltage source 25 is reduced. Thereupon, the transistors 37,38,39 are driven into the closing state such that the current from the current source now flows via the series-connected resistors 41. The high current flowing through the coil 19 tries to continue to flow and discharges to the auxiliary voltage source 35 which is configured here as a Zener diode. The latter generates a current from its anode via the rectifier diode 36, the resistor 24 and the inductor 34. Since this path is a low-impedance path, a rapid discharge of the current of the coil 19 occurs, and consequently, the switching valve 18 rapidly drops out after expiration of a defined period of time. Thus the switching valve has a defined and calculable cutoff time.

The invention claimed is:

1. A quick-acting valve, comprising:
a valve opening,
a valve member movable relative to the valve opening for controlling flow through the valve opening,
a coil supplied by a voltage source for effecting movement of the valve member relative to the valve opening,
a voltage-dependent resistor (33) provided between the voltage source and the coil, and
an auxiliary voltage source connected in parallel to the coil, the voltage of said auxiliary voltage source being opposite to that of said voltage source, wherein the auxiliary voltage source is connected in series with a rectifier diode, the series combination of the auxiliary voltage source and the rectifier diode connected in parallel with the coil to rapidly discharge the current of the coil, and
wherein the voltage-dependent resistor includes a plurality of electronic switches connected in series in the form of a cascade, said electronic switches each bridging a series resistor and being driven into the closing state when an input voltage applied by said voltage source falls below a given switching voltage whereby the electronic switches are driven simultaneously into the closing state.

2. The quick-acting valve according to claim 1, wherein the auxiliary voltage source comprises at least one Zener diode.

3. The quick-acting valve according to claim 1, wherein the auxiliary voltage source is connected in series with a rectifier diode and in parallel to the coil.

4. The quick-acting valve according to claim 1, wherein the switching voltage is determined by a reference voltage path.

5. A quick-acting valve comprising:
a valve opening,
a valve member movable relative to the valve opening for controlling flow through the valve opening,
a coil supplied by a voltage source for effecting movement of the valve member relative to the valve opening,
a voltage-dependent resistor provided between the voltage source and the coil, and
an auxiliary voltage source connected in parallel to the coil, the voltage of said auxiliary voltage source being opposite to that of said voltage source, wherein the auxiliary voltage source is connected in series with a rectifier diode, the series combination of the auxiliary voltage source and the rectifier diode connected in parallel with the coil to rapidly discharge the current of the coil, and
wherein the voltage-dependent resistor includes a plurality of electronic switches connected in series in the form of a cascade, said electronic switches each bridging a series resistor and being driven into the closing state when an input voltage applied by said voltage source falls below a given switching voltage, and
wherein each electronic switch is switched by an auxiliary transistor.

6. The quick-acting valve according to claim 5, wherein the auxiliary voltage source comprises at least one Zener diode.

7. The quick-acting valve according to claim 5, wherein the auxiliary voltage source is connected in series with a rectifier diode and in parallel to the coil.

8. The quick-acting valve according to claim 5, wherein the switching voltage is determined by a reference voltage path.

* * * * *